July 4, 1944.    G. DAUGHERTY    2,352,694
FENCE STRETCHER
Filed Aug. 31, 1943
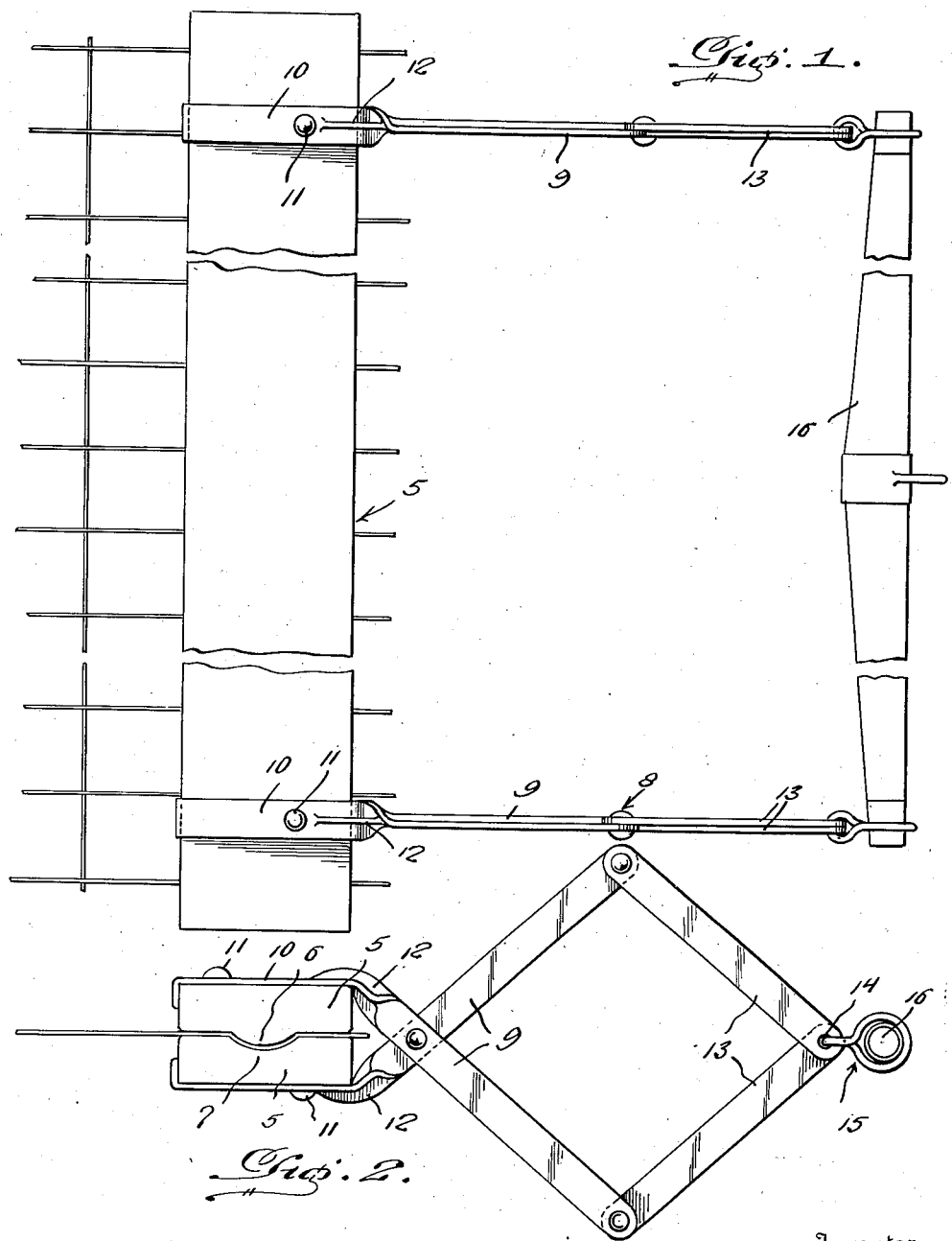
Inventor
George Daugherty,
By McMorrow and Berman
Attorneys Patented July 4, 1944

2,352,694

UNITED STATES PATENT OFFICE 2,352,694

FENCE STRETCHER

George Daugherty, Imperial, Calif.

Application August 31, 1943, Serial No. 500,702

2 Claims. (Cl. 254—83)

This invention relates to a fence stretcher especially adapted for stretching fence material of any of the fabricated types, and has for the primary object the provision of a device of the above stated character which will permit draft power of any selected kind to be evenly placed on the fence material throughout the entire height thereof to efficiently stretch said material and remove any slack which may bring about sagging or looseness of said material when in finished fence form.

Another object of this invention is the provision of elongated fence material clamp plates for gripping the material throughout its height and draft connecting means therefor which increases the clamping action of said plates on the material as the draft power is increased, eliminating any possibility of the clamp plates slipping from the fence material or any portion thereof engaged by said clamp plates and provides a construction which is extremely simple and quick to apply and remove from the fence material as well as the draft means.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation illustrating a fence stretcher constructed in accordance with my invention.

Figure 2 is a top plan view illustrating the device.

Referring in detail to the drawing, the numeral 5 indicates a pair of elongated rigid clamp plates or jaws to receive therebetween and grip fence material, as clearly shown in the drawing. One of the plates or jaws 5 has formed thereon a rib 6 extending the full length thereof to be received in a groove 7 of the other jaw or plate for the purpose of offsetting the fence material and thereby permit a more efficient grip to be obtained thereon.

Clamping devices 8 are secured to the plates or jaws 5 adjacent the ends thereof and each consists of a pair of crossed and pivotally connected levers 9. The levers 9 are provided with attaching portions 10 extending angularly thereto and which are secured to the jaws or plates 5 by bolts 11. The free ends of the attaching portions 10 are bent angularly to engage edges of the plates or jaws 5. The levers 9 are preferably constructed of flat elongated stock and where they form onto the attaching portions 10 are twisted to dispose the attaching portions angularly to the flat faces of said levers. The twisted portions are strengthened or reinforced by ribs 12 welded or otherwise secured to the opposite face of the stock.

The free ends of the levers have pivotally connected thereto links 13. The links 13 of each clamping device 8 converge and overlap and are provided with openings 14 in the overlapped ends.

Connectors 15 of the double eye type are provided and one eye passes through the openings 14 of the links 13, while the other eye may be positioned over a draft bar 16 from the end thereof. The draft bar may be of any suitable type or of the double tree type to which draft animals may be hitched so that when a pull is made on the draft bar, the clamping mechanisms 8 will urge the jaws or plates toward each other and in full clamping position on the material obviating any possible slippage between the jaws and the fence material and permitting an even distribution of the draft power on the fence material throughout its entire height to remove any slack which may be in any portion of the fence material. As soon as the draft power is slackened or relieved on the draft bar 16, the clamping action of the plates or jaws on the fence material is relieved so that the jaws or plates may be readily adjusted to another portion of the fence material or entirely removed therefrom if desired.

A device of the character described and shown in the drawing is extremely simple in construction and consists of a minimum number of parts so that the manufacture and sale thereof may be at a low cost. Also the construction of this device will permit easy application and removal of the device to fence material as well as to the draft source, it being understood that any type of draft source may be employed.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a fence stretcher, a pair of elongated rigid clamp plates to receive and grip therebetween fence fabric, and a pair of clamp operating devices connected to said plates adjacent the ends thereof and each including a pair of crossed pivotally connected levers of strap metal and attaching portions extending angularly thereto and secured to said plates and provided with right angularly disposed free ends to engage edges of the plates, said levers at the junction of the angular portions being twisted to lie flatly against the plates with the levers extending therefrom and having horizontally disposed surfaces, reinforcing ribs at the opposite sides of the levers at said twisted portions, and means for connecting a draft source to the ends of said levers.

2. In a fence stretcher, a pair of elongated rigid clamp plates to receive and grip therebetween fence fabric, a pair of clamp operating devices connected to said plates adjacent the ends thereof and each including a pair of crossed pivotally connected levers and attaching portions extending angularly thereto and secured to said plates and provided with right angularly disposed free ends to engage edges of the plates, links pivotally connected to the free ends of the levers and arranged in converging relation with the free ends thereof apertured and overlapped, fasteners including double eyes with one eye extending through the apertures of the links, said levers and links of the respective clamp operating devices extending in parallel relation from the plates of each of said pair of clamp operating devices, and a draft bar extending through the other eye.

GEORGE DAUGHERTY.